United States Patent
Tsai et al.

(10) Patent No.: US 7,639,687 B1
(45) Date of Patent: Dec. 29, 2009

(54) ENCODING SCHEME WITH ARBITRARY CONTROL SYMBOL PLACEMENT

(75) Inventors: Tung-Hao Tsai, San Mateo, CA (US); William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 1010 days.

(21) Appl. No.: 11/116,988

(22) Filed: Apr. 27, 2005

Related U.S. Application Data (60) Provisional application No. 60/640,562, filed on Dec. 30, 2004.

(51) Int. Cl.
*H04L 12/28* (2006.01)
*H04J 3/24* (2006.01)

(52) U.S. Cl. .................... 370/392; 370/474
(58) Field of Classification Search ............... 370/392, 370/474
See application file for complete search history.

(56) References Cited

U.S. PATENT DOCUMENTS

| | | | |
|---|---|---|---|
| 6,256,321 B1 * | 7/2001 | Kobayashi | 370/464 |
| 6,907,044 B1 * | 6/2005 | Yonge et al. | 370/445 |
| 7,343,425 B1 * | 3/2008 | Lo et al. | 709/246 |
| 7,343,540 B2 * | 3/2008 | Khermosh et al. | 714/758 |
| 7,469,297 B1 * | 12/2008 | Kostoff et al. | 709/236 |
| 7,487,426 B2 * | 2/2009 | Hoyer | 714/752 |
| 2003/0100267 A1 * | 5/2003 | Itoh et al. | 455/69 |

OTHER PUBLICATIONS

IEEE Computer Society, "*IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications*", IEEE Std 802.3—2002.

* cited by examiner

*Primary Examiner*—Andrew Lee (57) ABSTRACT

Systems and methods are provided for encoding and decoding. An encoder receives packets including control symbols from a plurality of independent data sources. The encoder produces a combination packet having a plurality of control symbols at arbitrary locations within the combination packet. The combination packet includes a sync header field to identify the combination packet as containing the plurality of control symbols, a block type field to locate the plurality of control symbols, and the plurality of control symbols. A corresponding decoder performs decoding.

54 Claims, 6 Drawing Sheets

| Input Data | SYNC | Block Payload | | | | | | | | |
|---|---|---|---|---|---|---|---|---|---|---|
| Bit Position | 0 1 2 | | | | | | | | | |
| Data Block Format: | | | | | | | | | | |
| $D_0D_1D_2D_3/D_4D_5D_6D_7$ | 01 | $D_0$ | $D_1$ | $D_2$ | $D_3$ | $D_4$ | $D_5$ | $D_6$ | $D_7$ | |
| Control Block Formats: | | Block Type Field | | | | | | | | |
| $C_0C_1C_2C_3/C_4C_5C_6C_7$ | 10 | 0x1e | $C_0$ | $C_1$ | $C_2$ | $C_3$ | $C_4$ | $C_5$ | $C_6$ | $C_7$ |
| $C_0C_1C_2C_3/O_4D_5D_6D_7$ | 10 | 0x2d | $C_0$ | $C_1$ | $C_2$ | $C_3$ | $O_4$ | $D_5$ | $D_6$ | $D_7$ |
| $C_0C_1C_2C_3/S_4D_5D_6D_7$ | 10 | 0x33 | $C_0$ | $C_1$ | $C_2$ | $C_3$ | | $D_5$ | $D_6$ | $D_7$ |
| $O_0D_1D_2D_3/S_4D_5D_6D_7$ | 10 | 0x66 | $D_1$ | $D_2$ | $D_3$ | $O_0$ | | $D_5$ | $D_6$ | $D_7$ |
| $O_0D_1D_2D_3/O_4D_5D_6D_7$ | 10 | 0x55 | $D_1$ | $D_2$ | $D_3$ | $O_0$ | $O_4$ | $D_5$ | $D_6$ | $D_7$ |
| $S_0D_1D_2D_3/D_4D_5D_6D_7$ | 10 | 0x78 | $D_1$ | $D_2$ | $D_3$ | | $D_4$ | $D_5$ | $D_6$ | $D_7$ |
| $O_0D_1D_2D_3/C_4C_5C_6C_7$ | 10 | 0x4b | $D_1$ | $D_2$ | $D_3$ | $O_0$ | $C_4$ | $C_5$ | $C_6$ | $C_7$ |
| $T_0C_1C_2C_3/C_4C_5C_6C_7$ | 10 | 0x87 | | $C_1$ | $C_2$ | $C_3$ | $C_4$ | $C_5$ | $C_6$ | $C_7$ |
| $D_0T_1C_2C_3/C_4C_5C_6C_7$ | 10 | 0x99 | $D_0$ | | $C_2$ | $C_3$ | $C_4$ | $C_5$ | $C_6$ | $C_7$ |
| $D_0D_1T_2C_3/C_4C_5C_6C_7$ | 10 | 0xaa | $D_0$ | $D_1$ | | $C_3$ | $C_4$ | $C_5$ | $C_6$ | $C_7$ |
| $D_0D_1D_2T_3/C_4C_5C_6C_7$ | 10 | 0xb4 | $D_0$ | $D_1$ | $D_2$ | | $C_4$ | $C_5$ | $C_6$ | $C_7$ |
| $D_0D_1D_2D_3/T_4C_5C_6C_7$ | 10 | 0xcc | $D_0$ | $D_1$ | $D_2$ | $D_3$ | | $C_5$ | $C_6$ | $C_7$ |
| $D_0D_1D_2D_3/D_4T_5C_6C_7$ | 10 | 0xd2 | $D_0$ | $D_1$ | $D_2$ | $D_3$ | $D_4$ | | $C_6$ | $C_7$ |
| $D_0D_1D_2D_3/D_4D_5T_6C_7$ | 10 | 0xe1 | $D_0$ | $D_1$ | $D_2$ | $D_3$ | $D_4$ | $D_5$ | | $C_7$ |
| $D_0D_1D_2D_3/D_4D_5D_6T_7$ | 10 | 0xff | $D_0$ | $D_1$ | $D_2$ | $D_3$ | $D_4$ | $D_5$ | $D_6$ | |

ENCODING SCHEME WITH ARBITRARY CONTROL SYMBOL PLACEMENT

CROSS REFERENCE TO RELATED APPLICATIONS

The present application claims priority to U.S. Provisional Patent Application No. 60/640,562, filed on Dec. 30, 2004; and is related to U.S. application Ser. No. 10/601,235, entitled LOW OVERHEAD CODING WITH ARBITRARY CODE PLACEMENT, filed on Jun. 20, 2003, each of which are incorporated herein by reference in their entirety.

BACKGROUND

The following disclosure generally relates to communication systems and data encoding and decoding.

Ethernet network devices include physical layer devices that transmit and receive data over a medium. In a Gigabit (Gb) Ethernet network device, the physical layer device includes a Physical Coding Sublayer (PCS), which acts as an interface between a Gigabit Media Independent Interface (GMII) or extended GMII (XGMII) and a Physical Medium Attachment (PMA) layer.

The PCS typically includes an encoder/decoder. The PCS may also include other components such as a scrambler and a gearbox in certain circumstances. The gearbox is not necessary when an analog circuit in the PMA can be designed to run in multiples of a reference clock or multiples of bus widths. In essence, the gearbox is a digital solution that is used to overcome analog circuit limitations. The encoder provides data formatting and organizes the data into data blocks (such as bytes) and control codes. The scrambler performs line balancing and ensures sufficient transition density. The function of the gearbox is application specific. The gearbox may include a buffer that is used to adjust for input/output speed differences and/or to format data width for a Serializer/Deserializer (SERDES).

In one approach, the PCS is implemented based on the 10GBASE-R standard in IEEE section 802.3. The 10GBASE-R standard implements 64B/66B encoding, which has low overhead. The 10GBASE-R standard restricts the placement of control codes within a data block during block encoding. When multiple independent communications channels are aggregated to provide a high-speed link, control codes may need to appear in any byte position of a data block after the channels are combined. Therefore, the 10GBASE-R standard may pose problems for aggregated communications channels.

SUMMARY

This disclosure generally describes encoders/decoders and methods of data encoding/decoding. In general, in one aspect, a system is provided. The system can include a plurality of MACs (Media Access Controls) that each can provide node-to-node network services for packets and produce an independent data stream from the packets, the packets including control symbols; a PCS (Physical Coding Sublayer), in communication with the plurality of MACs, can produce a combination packet from an aggregate packet, the combination packet can have a plurality of control symbols at arbitrary locations and can include a sync header field that can identify the packet as containing the plurality of control symbols, a block type field that can locate the plurality of control symbols, and the plurality of control symbols; a PMA (Physical Medium Attachment), in communication with the PCS, can serialize data associated with the combination packet; and a PMD (Physical Medium Dependent), in communication with the PMA, can drive electrical signals over a medium, the electrical signals representative of the combination packet.

In general, in another aspect, a system is provided. The system can include an encoder that can receive packets including control symbols from a plurality of independent data sources and can produce a combination packet that can have a plurality of control symbols at arbitrary locations within the combination packet, the combination packet can include a sync header field that can identify the combination packet as containing the plurality of control symbols, a block type field that can locate the plurality of control symbols, and the plurality of control symbols.

Particular implementations can include one or more of the following features. The block type field can contain a number of bits corresponding to a number and location of symbols in the combination packet. The plurality of control symbols can include at least one of an idle control symbol, a start of packet control symbol, an end of packet control symbol, an error propagation control symbol, or a carrier extend control symbol. The combination packet can include 34-bits, the sync header field can include 2-bits, the block type field can include 4-bits, and each of the plurality of control symbols can include 4-bits. The encoder can produce the combination packet to have 34-bits of data from 32-bits of data. The plurality of independent data sources can generate data packets in accordance with IEEE 802.3.

The system can further include a gearbox, in communication with the encoder, to adjust data rates associated with a number of bits input to and a number of bits output from the encoder. The system can further include a scrambler, in communication with the encoder, to maintain a DC balance of bits output from the encoder including inserting transitions into the output bits. The plurality of sources can include a plurality of MACs that produce a plurality of independent data streams. The system can further include a PCS which includes the encoder. The system can further include a PMA, in communication with the encoder, to serialize data associated with the combination packet. The system can further include a PMD, in communication with the encoder, to drive electrical signals over a medium, the electrical signals representative of the combination packet. An Ethernet network device can include the above-described system.

The encoder can encode the packets in accordance with control information, the control information can include one of a first or a second predetermined value, and the encoder can be operable to encode such that the combination packet includes a sync header field and a block payload that can include four data symbols if the control information is the first predetermined value, and the encoder is operable to encode such that the combination packet includes a different sync header field and a block payload including the block type field, data symbols and the plurality of control symbols if the control information is the second predetermined value as shown in FIG. 5 where a C can represent a control symbol, a D can represent a data symbol and an X can represent a don't care bit of a don't care symbol in the combination packet.

In general, in another aspect, a system is provided. The system can include a decoder to receive a combination packet that can have a plurality of control symbols at arbitrary locations within the combination packet and can produce packets to a plurality of independent data receivers from the combination packet, the combination packet can include a sync header field that can identify the combination packet as containing the plurality of control symbols, a block type field that can locate the plurality of control symbols, and the plurality of control symbols.

Particular implementations can include one or more of the following features. The block type field can contain a number of bits corresponding to a number and location of symbols in the combination packet. The plurality of control symbols can include at least one of an idle control symbol, a start of packet control symbol, an end of packet control symbol, an error propagation control symbol, or a carrier extend control symbol. The combination packet can include 34-bits, the sync header field includes 2-bits, the block type field can include 4-bits, and each of the plurality of control symbols can include 4-bits. The decoder can decode the combination packet to have 32-bits of data from 34-bits of data. The plurality of independent data sources can receive data packets in accordance with IEEE 802.3.

The system can further include a gearbox, in communication with the decoder, to adjust data rates associated with a number of bits output from and a number of bits input to the decoder. The system can further include a descrambler, in communication with the decoder, to remove transitions from input bits that are used to maintain a DC balance. The plurality of independent receivers can include a plurality of MACs that receive a plurality of independent data streams. The system can further include a PCS which includes the decoder.

The system can further include a PMA, in communication with the decoder, to deserialize data associated with the combination packet. The system can further include a PMD, in communication with the decoder, to receive electrical signals from a medium, the electrical signals representative of the combination packet. An Ethernet network device can include the above-described system.

The decoder can decode the combination packet in accordance with the sync header field, the sync header field including one of a first or a second predetermined value, and the decoder is operable to decode the combination packet to derive data symbols and corresponding control information for each of the data symbols if the sync header field is the first predetermined value, and the decoder is operable to decode the combination packet to include one or more data symbols, the plurality of control symbols and associated control information if the sync header field is the second predetermined value from corresponding locations in the combination packet as shown in FIG. 5 where a C represents a control symbol, a D represents a data symbol and an X represents a don't care bit of a don't care symbol in the combination packet.

In general, in another aspect, a method is provided that includes providing node-to-node network services for packets; producing an independent data stream from the packets, the packets can include control symbols; producing a combination packet from an aggregate packet, the combination packet can have a plurality of control symbols at arbitrary locations and can include a sync header field that can identify the packet as containing the plurality of control symbols, a block type field that can locate the plurality of control symbols, and the plurality of control symbols; serializing data associated with the combination packet; and driving electrical signals over a medium, the electrical signals representative of the combination packet.

In general, in another aspect, a method is provided that includes receiving packets from a plurality of independent data streams; and producing a combination packet that has a plurality of control symbols at arbitrary locations within the combination packet, the combination packet can include a sync header field that can identify the combination packet as containing the plurality of control symbols, a block type field that can locate the plurality of control symbols, and the plurality of control symbols.

Particular implementations can include one or more of the following features. The block type field can contain a number of bits corresponding to a number and location of symbols in the combination packet. The plurality of control symbols can include at least one of an idle control symbol, a start of packet control symbol, an end of packet control symbol, an error propagation control symbol, or a carrier extend control symbol. The combination packet can include 34-bits, the sync header field can include 2-bits, the block type field can include 4-bits, and each of the plurality of control symbols can include 4-bits. Producing can include producing the combination packet to have 34-bits of data from 32-bits of data. The plurality of independent data streams can include data packets in accordance with IEEE 802.3.

The method can further include adjusting data rates associated with a number of bits input to and a number of bits output from the encoder. The method can further include maintaining a DC balance of bits output from the encoder including inserting transitions into the output bits. The plurality of independent data streams can be related to node-to-node network services. The method can further include providing an interface between node-to-node network services and a medium.

The method can further include serializing data associated with the combination packet. The method can further include driving electrical signals over a medium, the electrical signals representative of the combination packet.

In general, in another aspect, a method is provided that includes receiving a combination packet that can have a plurality of control symbols at arbitrary locations within the combination packet; and producing packets to a plurality of independent data streams from the combination packet, the combination packet can include a sync header field that can identify the combination packet as containing the plurality of control symbols, a block type field that can locate the plurality of control symbols, and the plurality of control symbols.

Particular implementations can include one or more of the following features. The block type field can contain a number of bits corresponding to a number and location of symbols in the combination packet. The plurality of control symbols can include at least one of an idle control symbol, a start of packet control symbol, an end of packet control symbol, an error propagation control symbol, or a carrier extend control symbol. The combination packet can include 34-bits, the sync header field can include 2-bits, the block type field can include 4-bits, and each of the plurality of control symbols can include 4-bits. Producing packets can include decoding the combination packet to have 32-bits of data from 34-bits of data. The plurality of independent data streams can include data packets in accordance with IEEE 802.3.

The method can further include adjusting data rates associated with a number of bits output from and a number of bits input to the decoder. The method can further include removing transitions from input bits that are used to maintain a DC balance. The plurality of independent data streams can be related to node-to-node network services. The method can further include providing an interface between node-to-node network services and a medium. The method can further include deserializing data associated with the combination packet. The method can further include receiving electrical signals from a medium, the electrical signals representative of the combination packet.

In general, in another aspect, a system is provided that includes means for receiving packets from a plurality of independent data streams; and means for producing a combination packet that has a plurality of control symbols at arbitrary locations within the combination packet, the combination packet can include a sync header field that can identify the combination packet as containing the plurality of control symbols, a block type field that can locate the plurality of control symbols, and the plurality of control symbols.

In general, in another aspect, a system is provided that includes means for receiving a combination packet that can have a plurality of control symbols at arbitrary locations within the combination packet; and means for producing packets to a plurality of independent data streams from the combination packet, the combination packet can include a sync header field that can identify the combination packet as containing the plurality of control symbols, a block type field that can locate the plurality of control symbols, and the plurality of control symbols.

Aspects of the invention may offer one or more of the following advantages. A proposed encoder can place control symbols in arbitrary locations of a packet. The proposed encoder has a low encoding overhead suitable for high-speed communication rates of, for example, 4-Ghz and above. The proposed encoder allows serial data streams which reduce pin counts of an associated chip or device. A corresponding decoder offers similar advantages.

DETAILED DESCRIPTION

The following description of the preferred embodiment(s) is merely exemplary in nature and is not intended to limit the invention, its application, or uses. For purposes of clarity, the same reference numbers will be used in the drawings to identify similar elements. As used herein, the term device refers to an application specific integrated circuit, an electronic circuit, a processor (shared, dedicated, or group) and memory that execute one or more software programs, a combinational logic circuit, a combination of such, or other suitable components that provide the described functionality.

Figure 1:
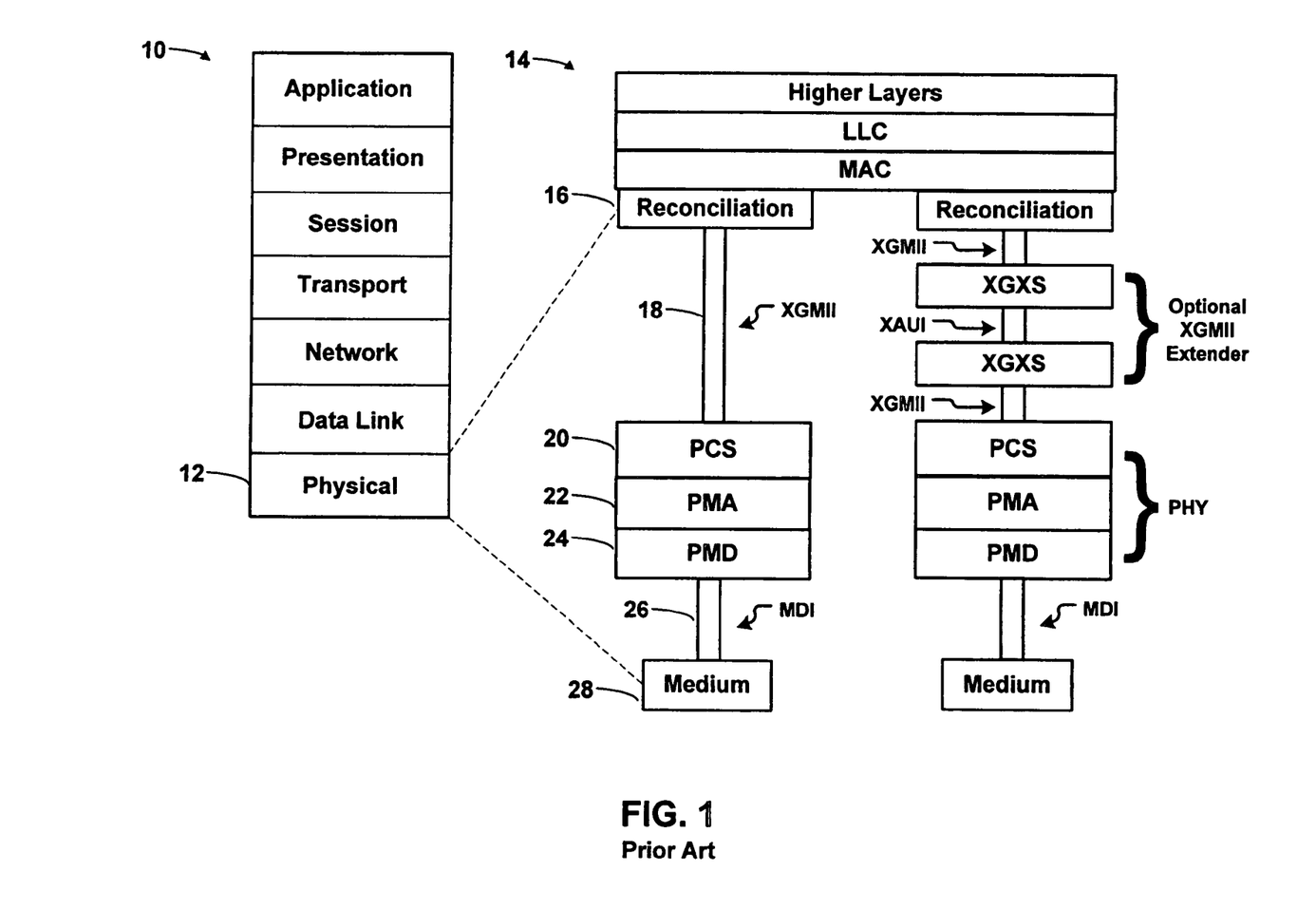
FIG. 1 is a schematic diagram illustrating the OSI Model and conventional sublayers in a physical layer device.

Referring to FIG. 1, the OSI Reference Model 10 defines a network device with a physical layer device 12 that transmits and receives data to/from a medium. The physical layer device 12 is further divided into a group of sublayer devices 14. FIG. 1 illustrates the group of sublayer devices 14 for Ten Gigabit Ethernet applications. The group of sublayer devices 14 includes a Ten Gigabit Ethernet reconciliation sublayer 16, a XGMII 18, a PCS 20, a Physical Medium Attachment (PMA) 22, a Physical Medium Dependant (PMD) sublayer 24, and a Medium Dependant Interface (MDI) 26. The medium is identified at 28. The PCS 20 encodes/decodes data to/from the XGMII 18 and transfers encoded data to/from the PMA 22.

Figure 2:
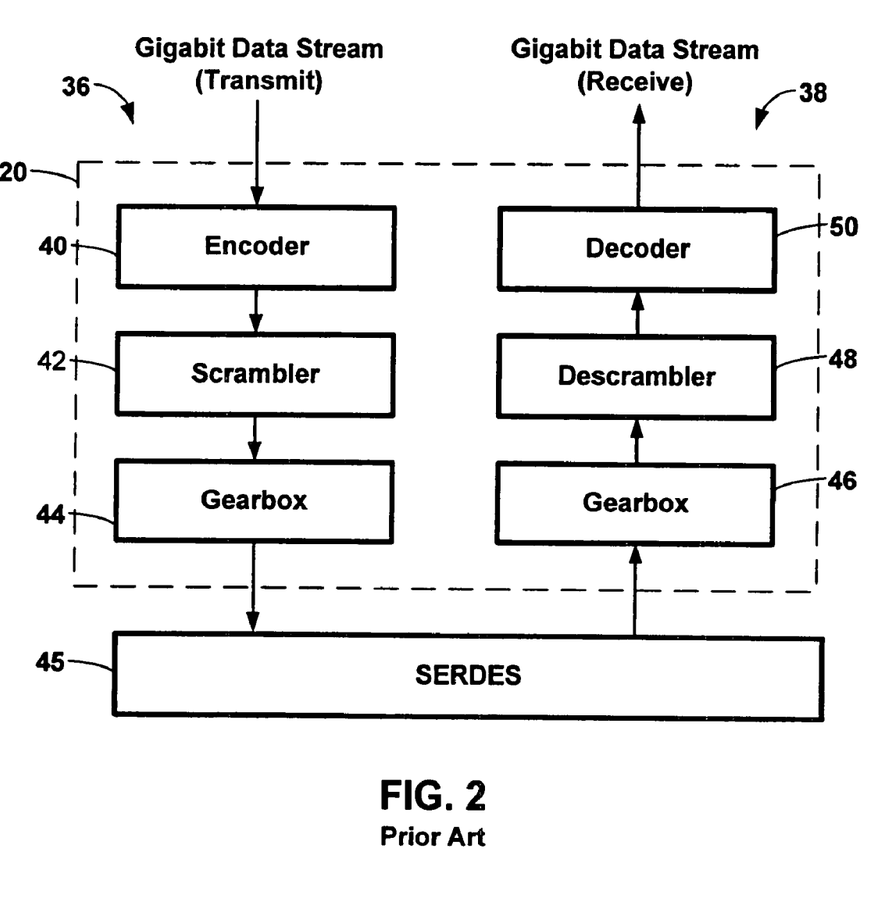
FIG. 2 is a block diagram of a conventional transmitter and a conventional receiver.

Referring now to FIG. 2, the PCS 20 includes a transmitter 36 and a receiver 38. The transmitter 36 includes an encoder 40, which assembles data blocks that include data bytes and/or control codes for transmission. The control codes include identification of the start and/or end of a packet and/or other data. The data blocks are transmitted from the encoder 40 to a scrambler 42. The scrambler 42 prepares the data blocks for transmission and ensures sufficient transition density. Data from the scrambler 42 is transmitted to a gearbox 44. The gearbox 44 formats data for a particular Serialzer/Deserialzer (SERDES) 45. The gearbox 44 may include a FIFO buffer (not shown), which is used to convert from one speed to another and/or to modify the width of a bit pattern. The receiver 38 includes a gearbox 46, a descrambler 48, and a decoder 50, which implement the reverse of the transmit process.

For each data block transmitted, it is desirable to allow for combinations of data (e.g., 256 combinations) and a number of control codes (e.g., a limited number). For example, in 1000BASE-X 8 bit to 10 bit encoding, there are 256 possible data combinations and 12 possible control code combinations. Since there are 256+12=268 total combinations, 9 bits of data are required to encode all valid data blocks. The overhead is high because an additional bit is used to generate only 12 more combinations. When 8 bit to 10 bit encoding is implemented, 10 bits are used instead of 9, which produces an even larger overhead. 10 bits are used in 1000BASE-X to preserve DC balance and to ensure that sufficient transitions exist through redundant bits.

A 64B/66B block coding concept is implemented by IEEE 802.3 in the 10GBASE-R PCS. 10GBASE-R reduces overhead and achieves DC balance through scrambling and guaranteed periodic transitions with a sync header. The additional coding complexity on the digital side increases latency in the system. Since the circuit can be run at a lower rate, power is saved.

Figure 3:
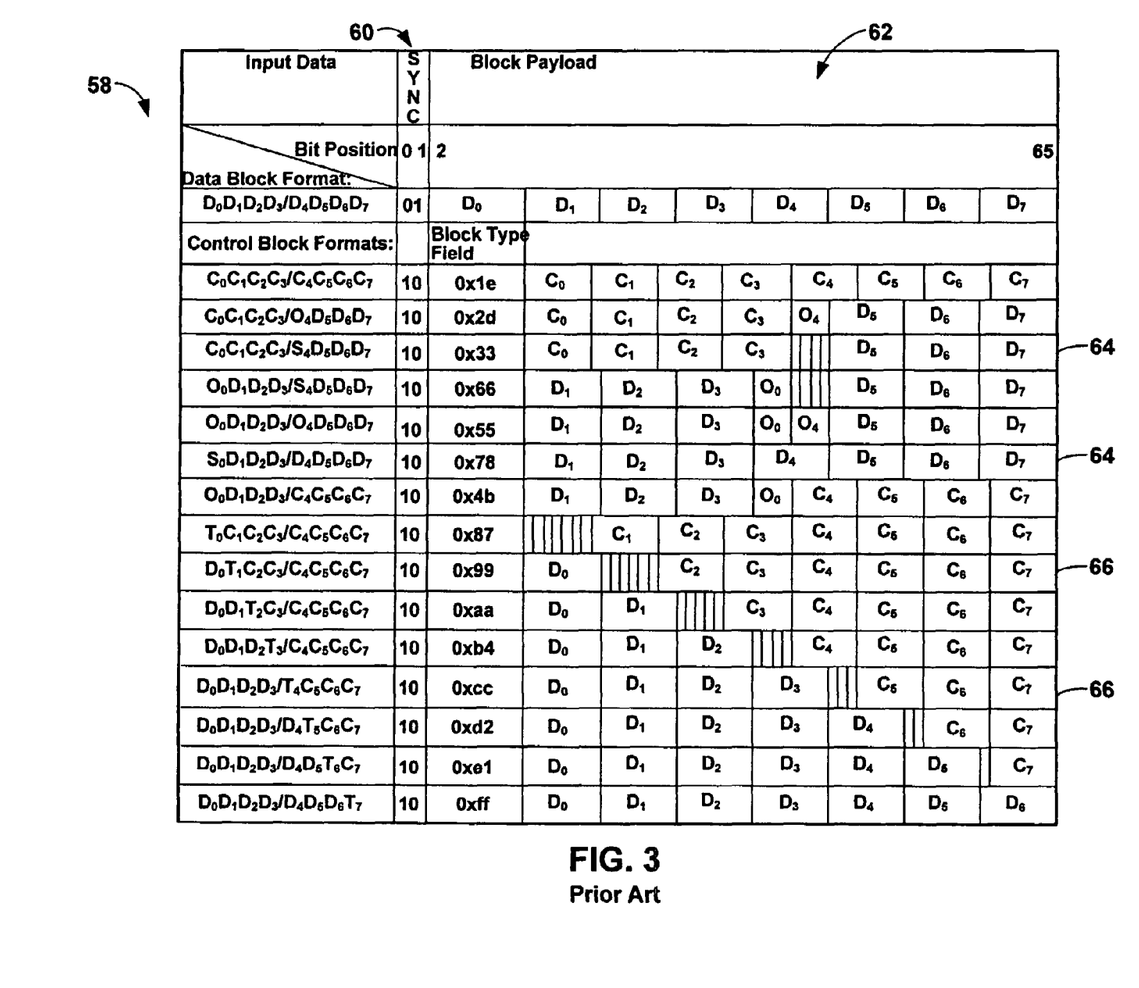
FIG. 3 illustrates combinations of control codes and data bytes within a data block using conventional 64B/66B encoding.

Referring now to FIG. 3, a conventional block encoding scheme 58 for 10GBASE-R is shown. The block encoding scheme 58 is set forth in IEEE 802.3. A 2-bit sync header 60 is followed by a 64-bit block of data 62. Each 64-bit block of data 62 includes 8 bytes that may be data bytes 64 and/or control codes 66. Bytes labeled with a C, O, S, or T represent control codes 66. Bytes labeled with a D represent data bytes 64. A 2-bit sync header 60 with a value of 01 indicates that the entire 64-bit block of data 62 is made up of data bytes 64. When the 2-bit sync header 60 has a value of 10, at least one of the control codes 66 exists among the 64-bit block of data 62.

FIG. 3 shows that there are a limited number of permutations for the control codes 66 and data bytes 64. Many combinations are not possible. For example, the combination $C_0$, $D_1$, $C_2$, $C_3$, $D_4$, $C_5$, $D_6$, $C_7$ is not possible. This limitation creates a problem when control codes 66 need to be placed within any byte in a 64-bit block of data 62. For example, when multiple independent data streams are aggregated into a high-speed link, control codes 66 need to appear in any location of a 64-bit block of data 62. Aggregation is very useful in reducing the pin count of devices. Therefore, a conventional 10GBASE-R PCS cannot be used as currently designed when multiple independent data streams need to be aggregated.

Figure 4:
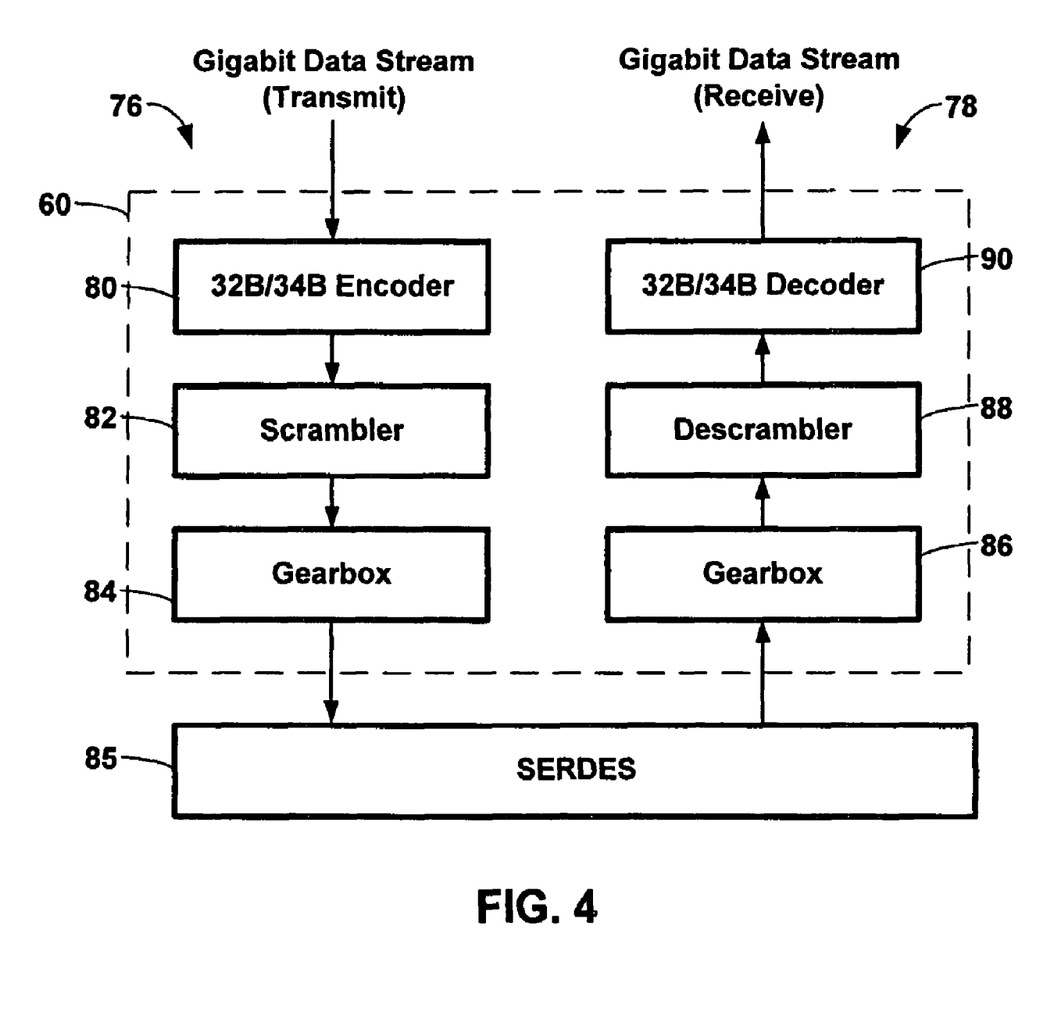
FIG. 4 is a block diagram of a proposed transmitter and a proposed receiver.

FIG. 4 is a block diagram illustrating a PCS 60 and a SERDES 85. PCS 60 includes a transmitter 76 and a receiver 78. Transmitter 76 includes a 32B/34B encoder 80, a scrambler 82 and a gearbox 84. Receiver 78 includes a gearbox 86, a descrambler 88, and a 32B/34B decoder 90.

32B/34B encoder 80 includes an input for receiving a data stream, for example, from a FIFO. The FIFO can store data from independent data sources as aggregate packets. 32B/34B encoder 80 includes an output for producing an encoded data stream. 32B/34B encoder 80 can map codewords for 32-bits of disparate data (and 4×1-bit of control information) in aggregated packets to generate a 32-bit payload of organized data. A combined packet includes the 32-bit payload and also a 2-bit sync header to mark packet boundaries and indicate whether the packet contains control symbols. The payload can include data symbols and arbitrarily placed control symbols from several data sources. In one implementation, the data sources place control symbols according to a fixed format. However, the placement of control symbols in the combined packet produced by the 32B/34B encoder 80 is arbitrary. 32B/34B encoder 80 generates a block type field to locate control symbols (e.g., by using 1-bit of control information embedded in the data stream at the input). For example, a code of 1-0-1-0 in a block type field can indicate that the first and third symbol positions contain control symbols.

Scrambler 82 ensures transition density in a bit stream received from 32B/34B encoder 80. Gearbox 84 formats data for SERDES 85 and can use a FIFO (not shown) to convert the bit stream to an appropriate data rate. Receiver 78 implements a reverse process with respect to the above described transmitter 76.

Figure 5:
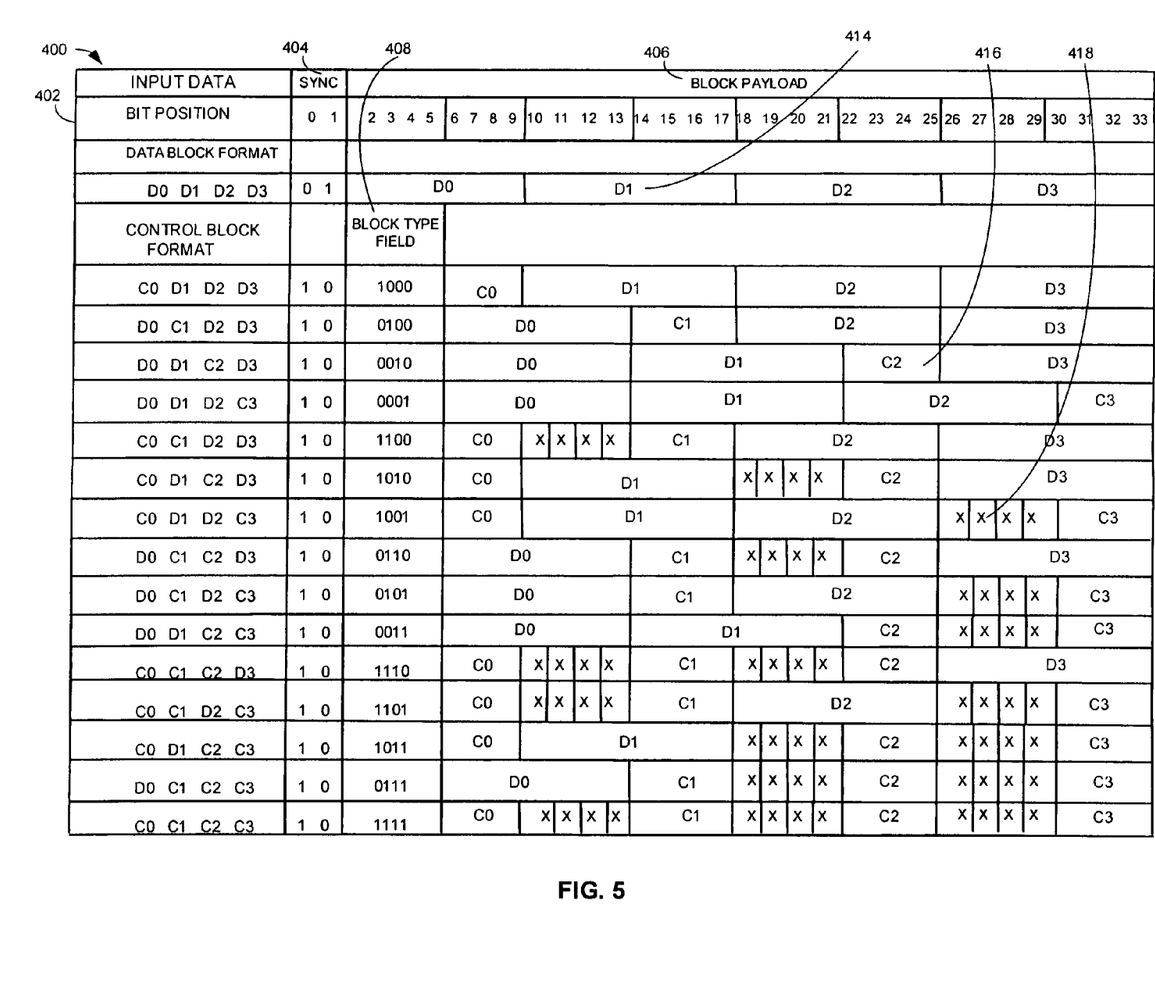
FIG. 5 is a table illustrating packet fields and contents generated by the proposed transmitter and receiver of FIG. 4.

FIG. 5 is a table 400 illustrating packet fields and contents generated by 32B/34B encoder 80. Table 400 includes a sync header field 404 and a block payload field 406 across a bit position row 402. Block payload field 406 can further include a block type field 408, data symbols 414, control symbols 416, and don't care symbols 418.

Sync header field 404 comprises 2-bits at the beginning of a packet. In one implementation, sync header field 404 indicates whether an associated packet contains only data symbols 414 or contains one or more control symbols 416. For example, when sync header field 404 contains a code 1-0, a packet contains only data symbols 414. In another example, when sync header field 404 contains a code 0-1, a packet contains one or more control symbols 416. Sync header field 404 can also represent a boundary marker for a receiver to track valid incoming packets. For example, when sync header field 404 contains a code 0-0 or 1-1, an associated packet is invalid.

In one implementation, block payload field 406 comprises 32-bits of data in various formats. As discussed above, when sync header field 404 contains a code 1-0, block payload field 406 includes only data symbols 414. Otherwise, block payload field 406 can include one or more arbitrarily placed control symbols 416, data symbols 414, don't care symbols 418, and a block type field 408.

In one or more implementations, block type field 408 comprises 4-bits and is located at the front boundary of block payload field 406. In one or more implementations, block type field 408 specifies where control symbols 416 are located within block payload field 406. For example, a code of 1-0-0-0 indicates that a control symbol 416 is located in a first octet.

Data symbol 414 is a field containing data bits. Data symbol 414 can be, for example 8-bits. In one implementation, data symbol 414 facilitates layer-to-layer data information, such as MAC (Media Access Control)-to-MAC communication of subnet addresses.

Control symbol 416 is a field containing control bits. Control symbol 416 can be, for example, 4-bits (allowing 16 types of control symbols 416). In one implementation, control symbol 416 facilitates layer-to-layer control information. For example, an I-type control symbol indicates idleness; an S-type control symbol indicates the start of packet; a T-type control symbol indicates the end of packet; a V-type control symbol indicates a propagation error; and an R-type control symbol indicates a carrier extend. Other implementations can have additional types of control symbols 416.

Don't care symbol 418 represents a portion of a field containing no relevant information. Don't care symbol 418 can be, for example, a 4-bit insertion. In one implementation, don't care symbol 418 merely fills out a boundary (e.g., can follow a 4-bit control symbol 416). Although don't care symbol 418 can advance a count of bit position 402, information within don't care symbol 418 is generally not used.

Figure 6:
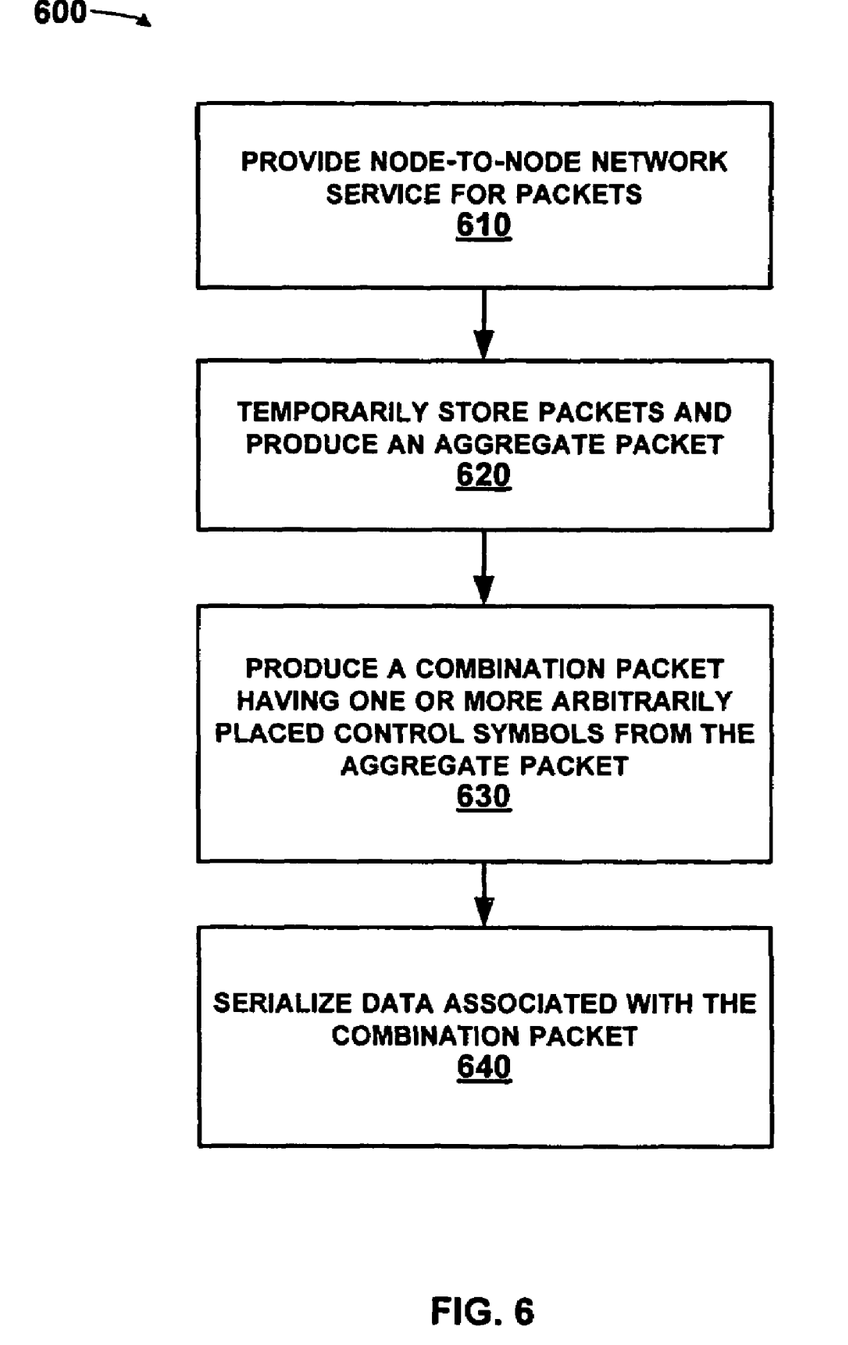
FIG. 6 is a flow diagram illustrating a method for data encoding with arbitrary symbol placement.

FIG. 6 is a flow diagram illustrating a method 600 for data encoding with arbitrary control symbol placement. With reference to FIGS. 4, 5, and 6, a node-to-node network service (e.g., layer 2 service) for packets is provided 610 (e.g., by MAC devices). The packets can be data symbols, control symbols or don't care symbols. The packets are temporarily stored, and an aggregate packet is produced 620 (e.g., by a FIFO buffer). The aggregate packet can have a symbol interleaved from each of several independent data streams.

A combination packet is produced from the aggregate packet 630 (e.g., by transmitter 76). In one implementation, the combination packet is produced with 32B/34B encoding (e.g., by 32B/34B encoder 80). The combination packet can have one or more arbitrarily placed control symbols. The combination packet includes a sync header field to identify the packet as containing the one or more control symbols, and if present, a block type field to locate the one or more control symbols, and the one or more control symbols (e.g., block payload field 406).

Data associated with the combination packet is serialized 640 (e.g., by SERDES 85). Serialized data is transmitted over a physical medium. A decode method for data decoding of arbitrarily placed symbols operates in reverse of method 600.

A number of implementations have been described. Nevertheless, it will be understood that various modifications may be made. In some implementations, for example, different lengths of fields can be used, different codes can be sued, and a different number of block type fields are possible. Accordingly, other implementations are within the scope of the following claims.

What is claimed is:

1. A system, including:
    a plurality of MACs (Media Access Controls) each providing node-to-node network services for packets and producing an independent data stream from the packets, the packets including control symbols;
    a PCS (Physical Coding Sublayer), in communication with the plurality of MACs, to produce a combination packet from an aggregate packet, the combination packet having a plurality of control symbols at arbitrary locations and including a sync header field to identify the packet as containing the plurality of control symbols, a block type field to locate the plurality of control symbols, and the plurality of control symbols;
    a PMA (Physical Medium Attachment), in communication with the PCS, to serialize data associated with the combination packet; and
    a PMD (Physical Medium Dependent), in communication with the PMA, to drive electrical signals over a medium, the electrical signals representative of the combination packet.

2. A system, including:
    an encoder to receive packets including control symbols from a plurality of independent data sources and produce a combination packet having a plurality of control symbols at arbitrary locations within the combination packet, the combination packet including a sync header field to identify the combination packet as containing the plurality of control symbols, a block type field to locate the plurality of control symbols, and the plurality of control symbols.

3. The system of claim 2, wherein the block type field contains a number of bits corresponding to a number and location of symbols in the combination packet.

4. The system of claim 2, wherein the plurality of control symbols includes at least one of an idle control symbol, a start of packet control symbol, an end of packet control symbol, an error propagation control symbol, or a carrier extend control symbol.

5. The system of claim 2, wherein the combination packet includes 34-bits, the sync header field includes 2-bits, the block type field includes 4-bits, and each of the plurality of control symbols includes 4-bits.

6. The system of claim 2, wherein the encoder produces the combination packet to have 34-bits of data from 32-bits of data.

7. The system of claim 2, wherein the plurality of independent data sources generate data packets in accordance with IEEE 802.3.

8. The system of claim 2, further including:
a gearbox, in communication with the encoder, to adjust data rates associated with a number of bits input to and a number of bits output from the encoder.

9. The system of claim 2, further including:
a scrambler, in communication with the encoder, to maintain a DC balance of bits output from the encoder including inserting transitions into the output bits.

10. The system of claim 2, wherein the plurality of sources include a plurality of MACs (Media Access Controls) that produce a plurality of independent data streams.

11. The system of claim 2, further including a PCS (Physical Coding Sublayer) which includes the encoder.

12. The system of claim 2, further including:
a PMA (Physical Medium Attachment), in communication with the encoder, to serialize data associated with the combination packet.

13. The system of claim 2, further including:
a PMD (Physical Medium Dependent), in communication with the encoder, to drive electrical signals over a medium, the electrical signals representative of the combination packet.

14. An Ethernet network device including the system of claim 2.

15. The system of claim 2, wherein the encoder encodes the packets in accordance with control information, the control information including one of a first or a second predetermined value, and the encoder is operable to encode such that the combination packet includes a sync header field and a block payload including four data symbols if the control information is the first predetermined value, and the encoder is operable to encode such that the combination packet includes a different sync header field and a block payload including a block type field, data symbols and the plurality of control symbols if the control information is the second predetermined value as follows:

| synch header field | block type field | | | | | | | block payload — control and data symbols | | |
|---|---|---|---|---|---|---|---|---|---|---|
| 10 | 1000 | C0 | | D1 | | D2 | | D3 | | |
| 10 | 0100 | D0 | | C1 | | D2 | | D3 | | |
| 10 | 0010 | D0 | | D1 | | C2 | | D3 | | |
| 10 | 0001 | D0 | | D1 | | D2 | | C3 | | |
| 10 | 1100 | C0 | XXXX | C1 | | D2 | | D3 | | |
| 10 | 1010 | C0 | D1 | | | XXXX | C2 | D3 | | |
| 10 | 1001 | C0 | D1 | | | D2 | | XXXX | C3 | |
| 10 | 0110 | D0 | | C1 | XXXX | C2 | | D3 | | |
| 10 | 0101 | D0 | | C1 | | D2 | | XXXX | C3 | |
| 10 | 0011 | D0 | | D1 | | C2 | XXXX | C3 | | |
| 10 | 1110 | C0 | XXXX | C1 | XXXX | C2 | | D3 | | |
| 10 | 1101 | C0 | XXXX | C1 | | D2 | | XXXX | C3 | |
| 10 | 1011 | C0 | D1 | | | XXXX | C2 | XXXX | C3 | |
| 10 | 0111 | D0 | | C1 | XXXX | C2 | | XXXX | C3 | |
| 10 | 1111 | C0 | XXXX | C1 | XXXX | C2 | XXXX | C3 | | | where a C represents a control symbol, a D represents a data symbol and an X represents a don't care bit of a don't care symbol in the combination packet.

16. A system, including:
a decoder to receive a combination packet having a plurality of control symbols at arbitrary locations within the combination packet and produce packets to a plurality of independent data receivers from the combination packet, the packet including a sync header field to identify the combination packet as containing the plurality of control symbols, a block type field to locate the plurality of control symbols, and the plurality of control symbols.

17. The system of claim 16, wherein the block type field contains a number of bits corresponding to a number and location of symbols in the combination packet.

18. The system of claim 16, wherein the plurality of control symbols includes at least one of an idle control symbol, a start of packet control symbol, an end of packet control symbol, an error propagation control symbol, or a carrier extend control symbol.

19. The system of claim 16, wherein the combination packet includes 34-bits, the sync header field includes 2-bits, the block type field includes 4-bits, and each of the plurality of control symbols includes 4-bits.

20. The system of claim 16, wherein the decoder decodes the combination packet to have 32-bits of data from 34-bits of data.

21. The system of claim 16, wherein the plurality of independent data receivers receive data packets in accordance with IEEE 802.3.

22. The system of claim 16, further including:
a gearbox, in communication with the decoder, to adjust data rates associated with a number of bits output from and a number of bits input to the decoder.

23. The system of claim 16, further including:
a descrambler, in communication with the decoder, to remove transitions from input bits that are used to maintain a DC balance.

24. The system of claim 16, wherein the plurality of independent data receivers include a plurality of MACs (Media Access Controls) that receive a plurality of independent data streams.

25. The system of claim 16, further including a PCS (Physical Coding Sublayer) which includes the decoder.

26. The system of claim 16, further including:
a PMA (Physical Medium Attachment), in communication with the decoder, to deserialize data associated with the combination packet.

27. The system of claim 16, further including:
a PMD (Physical Medium Dependent), in communication with the decoder, to receive electrical signals from a medium, the electrical signals representative of the combination packet.

28. An Ethernet network device including the system of claim 16.

29. The system of claim 16, wherein the decoder decodes the combination packet in accordance with the sync header field, the sync header field including one of a first or a second predetermined value, and
the decoder is operable to decode the combination packet to derive data symbols and corresponding control information for each of the data symbols if the sync header field is the first predetermined value, and
the decoder is operable to decode the combination packet to include one or more data symbols, the plurality of control symbols and associated control information if the sync header field is the second predetermined value from corresponding locations in the combination packet as follows:

| synch header field | Block type field | block payload control and data symbols | | | | | | | |
|---|---|---|---|---|---|---|---|---|---|
| 10 | 1000 | C0 | D1 | | D2 | | D3 | | |
| 10 | 0100 | D0 | | C1 | D2 | | D3 | | |
| 10 | 0010 | D0 | | D1 | | C2 | D3 | | |
| 10 | 0001 | D0 | | D1 | | D2 | | C3 | |
| 10 | 1100 | C0 | XXXX | C1 | D2 | | D3 | | |
| 10 | 1010 | C0 | D1 | | XXXX | C2 | D3 | | |
| 10 | 1001 | C0 | D1 | | D2 | | XXXX | C3 | |
| 10 | 0110 | D0 | | C1 | XXXX | C2 | D3 | | |
| 10 | 0101 | D0 | | C1 | D2 | | XXXX | C3 | |
| 10 | 0011 | D0 | | D1 | | C2 | XXXX | C3 | |
| 10 | 1110 | C0 | XXXX | C1 | XXXX | C2 | D3 | | |
| 10 | 1101 | C0 | XXXX | C1 | D2 | | XXXX | C3 | |
| 10 | 1011 | C0 | D1 | | XXXX | C2 | XXXX | C3 | |
| 10 | 0111 | D0 | | C1 | XXXX | C2 | XXXX | C3 | |
| 10 | 1111 | C0 | XXXX | C1 | XXXX | C2 | XXXX | C3 | | where a C represents a control symbol, a D represents a data symbol and an X represents a don't care bit of a don't care symbol in the combination packet.

30. A method, including:
providing node-to-node network services for packets;
producing an independent data stream from the packets, the packets including control symbols;
producing, by an encoder, a combination packet from an aggregate packet, the combination packet having a plurality of control symbols at arbitrary locations and including a sync header field to identify the packet as containing the plurality of control symbols, a block type field to locate the plurality of control symbols, and the plurality of control symbols;
serializing data associated with the combination packet; and
driving electrical signals over a medium, the electrical signals representative of the combination packet.

31. A method, including:
receiving packets from a plurality of independent data streams; and
producing, by an encoder, a combination packet having a plurality of control symbols at arbitrary locations within the combination packet, the combination packet including a sync header field to identify the combination packet as containing the plurality of control symbols, a block type field to locate the plurality of control symbols, and the plurality of control symbols.

32. The method of claim 31, wherein the block type field contains a number of bits corresponding to a number and location of symbols in the combination packet.

33. The method of claim 31, wherein the plurality of control symbols includes at least one of an idle control symbol, a start of packet control symbol, an end of packet control symbol, an error propagation control symbol, or a carrier extend control symbol.

34. The method of claim 31, wherein the combination packet includes 34-bits, the sync header field includes 2-bits, the block type field includes 4-bits, and each of the plurality of control symbols includes 4-bits.

35. The method of claim 31, wherein producing includes:
producing the combination packet to have 34-bits of data from 32-bits of data.

36. The method of claim 31, wherein the plurality of independent data streams include data packets in accordance with IEEE 802.3.

37. The method of claim 31, further including:
adjusting data rates associated with a number of bits input to and a number of bits output from the encoder.

38. The method of claim 31, further including:
maintaining a DC balance of bits output from the encoder including inserting transitions into the output bits.

39. The method of claim 31, wherein the plurality of independent data streams are related to node-to-node network services.

40. The method of claim 39, further including:
providing an interface between node-to-node network services and a medium.

41. The method of claim 31, further including:
serializing data associated with the combination packet.

42. The method of claim 31, further including:
driving electrical signals over a medium, the electrical signals representative of the combination packet.

43. A method, including:
receiving a combination packet having a plurality of control symbols at arbitrary locations within the combination packet; and
producing, by a decoder, packets to a plurality of independent data streams from the combination packet, each packet including a sync header field to identify the combination packet as containing the plurality of control symbols, a block type field to locate the plurality of control symbols, and the plurality of control symbols.

44. The method of claim 43, wherein the block type field contains a number of bits corresponding to a number and location of symbols in the combination packet.

45. The method of claim 43, wherein the plurality of control symbols includes at least one of an idle control symbol, a start of packet control symbol, an end of packet control symbol, an error propagation control symbol, or a carrier extend control symbol.

46. The method of claim 43, wherein the combination packet includes 34-bits, the sync header field includes 2-bits, the block type field includes 4-bits, and each of the plurality of control symbols includes 4-bits.

47. The method of claim 43, wherein producing packets includes decoding the combination packet to have 32-bits of data from 34-bits of data.

48. The method of claim 43, wherein the plurality of independent data streams receive data packets in accordance with IEEE 802.3.

49. The method of claim 43, further including:
adjusting data rates associated with a number of bits output from and a number of bits input to the decoder.

50. The method of claim 43, further including:
removing transitions from input bits that are used to maintain a DC balance.

51. The method of claim 43, wherein the plurality of independent data streams are related to node-to-node network services.

52. The method of claim 51, further including:
providing an interface between node-to-node network services and a medium.

53. The method of claim 43, further including:
deserializing data associated with the combination packet.

54. The method of claim 43, further including:
receiving electrical signals from a medium, the electrical signals representative of the combination packet.

* * * * *